United States Patent [19]

Warner et al.

[11] Patent Number: 4,800,313

[45] Date of Patent: Jan. 24, 1989

[54] LONG-LIFE MOTOR BRUSH HOLDER

[75] Inventors: Robin L. Warner, Mt. Holly Springs; Richard E. DeSisto, Carlisle, both of Pa.

[73] Assignee: General Signal Corporation, Stamford, Conn.

[21] Appl. No.: 113,849

[22] Filed: Oct. 29, 1987

[51] Int. Cl.[4] ..................... H02K 13/00

[52] U.S. Cl. ..................... 310/242; 310/239; 310/245; 310/248

[58] Field of Search ............... 310/239, 240, 241, 242, 310/244, 245, 246, 247, 248, 249, 43

[56] References Cited

U.S. PATENT DOCUMENTS

| | | | |
|---|---|---|---|
| 2,842,692 | 7/1958 | Johnson | 310/239 |
| 3,025,421 | 3/1962 | Sievert | 310/245 |
| 3,430,084 | 2/1969 | Hall | 310/242 |
| 4,389,588 | 6/1983 | Rankin | 310/242 |

FOREIGN PATENT DOCUMENTS

| | | | |
|---|---|---|---|
| 0658776 | 4/1938 | Fed. Rep. of Germany | 310/245 |
| 3010036 | 10/1981 | Fed. Rep. of Germany | 310/242 |

*Primary Examiner*—R. Skudy

*Attorney, Agent, or Firm*—Robert R. Hubbard; John F. Ohlandt

[57] ABSTRACT

A long-life motor brush holder which significantly minimizes contact of the coil portions of a ribbon spring with the holder and consequently reduces friction drag; the arrangement is such that at least two cylindrical surfaces forming part of the brush holder serve as line contact supports for each of the respective coil portions of the ribbon spring so as to produce minimal contact, the spring including a middle portion for residually engaging the brush to urge it against the motor commutator.

9 Claims, 3 Drawing Sheets

LONG-LIFE MOTOR BRUSH HOLDER

FIELD OF THE INVENTION

This invention relates to motor brush holders or housing, and more particularly to an improvement in what are known as long-life brush holders.

BACKGROUND OF THE INVENTION

The useful life of A.C. series universal motors that typically find application in appliances, tools and the like, as well as in many industrial contexts, is usually limited to the length of the carbon brush, is rate of wear, and—in the case of replaceable brushes—the number of times the brushes can be replaced befor the commutator begins to wear severely.

It will be understood that the rate of wear of the brush is a function of the load, the speed of the motor, and most importantly, the spring pressure that is applied to the brush to keep it in bearing contact with the commutator. The curve of brush wear plotted against spring pressure, however, forms a parabola. Accordingly, it will be appreciated that with too much spring pressure the mechanical wear will become excessive, an improper film is formed on the commutator, and the brush life falls markedly. On the other hand, with too little pressure applied, the electrical arcing due to the high contact resistance and the mechanical abrasion due to brush bounce greatly reduce the possible life of the brush.

The typical motor brush rigging involves a helical spring bearing on the carbon brush, the two elements being combined in a box-like holder such that the brush is urged against the commutator. Although this design, as is understood, is used universally, it has the following limitations:

The pressure produced by a helical spring is a function of its compssion or extension. Therefore, when the brush assembly is brand new, and the brushes are at maximum length, the spring is at its fullest compression and the pressure therefore at its highest; at the end of the brush life, the spring extension is at its greatest and the pressure now is below the ideal. Therefore, depending on the spring rate, only a portion of the brush wear is in the ideal spring pressure range.

The long-life brush design uses a ribbon spring that is essentially wound like a clock spring and is set to unwind in such a direction as to hold the brush against the commutator. Since ribbon springs have an essentially constant force, the ideal pressure range can be obtained, thereby obtaining maximum wear on the brush from this aspect.

In addition to the force deflection curve, the helical spring also has a finite collapsed length. Accordingly, since the spring is generally located behind the brush in accordance with the usual way of enclosing it in the brush box, the space that it requires dictates that a shorter brush be used.

The long-life brush holders that have been designed and have now become conventional are such that the ribbon spring is arranged so that the coils providing the force are mounted outside of the brush holder on either side. Hence only a thin ribbon section of the spring is under the brush. Consequently, the long-life-design has an additional advantage in that it provides extra space for a longer brush, and hence ensures the desired longer life.

Despite the advantages associated with the so-called long-life brush holders, a difficult problem arises with this design in that occasionally erratic brush life results due to the fact that the walls confining the spring coil portions tend to impede the unwinding or rotation of the coil portions. This is because of vibration and the back and forth motion of the brush. Also, the coil portions are riding back and forth, or in and out, as well as de-reeling in their receptacles.

It is well understood and appreciated that it is essential that the brush at all times follow the commutator. However, no matter how well one machines the commutator, the shaft and the bearing surfaces, there is bound to be some eccentricity to the system. Accordingly, it is very important to maintain not only the spring pressure, but the degree of freedon of the whole system to move.

It is therefore a primary object of the present invention to ensure that the proper spring pressure is applied to the brushes in a motor context at all times, and to guarantee complete freedom of movement for the system.

It is also understood that in the conventional design of the long-life brush holder, the springs, as they move back and forth in the receptacles, tend to hit the wall and drag on the bottom or floor of such receptacles. Additionally, debris such as carbon dust and the like is deposited in these areas, which further tends to reduce the freedom of the system to move.

It is therefore another primary object of the present invention to prevent the springs from moving back and forth in their receptacles such that they hit the wall or drag on the bottom or floor of such receptacles, it being a further object to cut down on the debris that tends to reduce the freedom of movement in the system.

The above and other objects are accomplished in accordance with first and second preferred embodiments of the present invention.

SUMMARY OF THE INVENTION

In fulfillment of the above-noted and other objects of the invention, there is provided as a primary feature an arrangement including a generally box-shaped housing, the motor brush being retained within said housing while adapted to bear against the motor commutator; there is further provided a ribbon spring for urging the brush against the commutator, the spring comprising a main portion and a pair of end coil portions, the middle or main portion between the coil portions forming a saddle for the brush. However, instead of the end coil portions bearing against a wall or walls of a receptacle, the arrangement is such that the outer wall of the receptacle is eliminated, and at least two semi-cylindrical surfaces are provided for establishing point or line contacts with each coil portion of the spring. In the first embodiment of the invention, these two cylindrical surfaces are defined by semi-cylindrical projections or ribs on the floor of each of said receptacles, which, together with the fact that the outer wall of each of the receptacles has been removed, thereby allows free movement of the spring.

In a second preferred embodiment, the primary feature takes the form of a post-type construction. More specifically, three, spacial cylindrical surfaces are provided for the aforenoted point/line contact with each coil portion of the spring. One of these surfaces is formed by a dowel post, such post being circular cylindrical in shape, and the other two cylindrical surfaces are defined by diametrically opposed, semi-cylindrical molded portions of the brush holder.

Other and further objects, advantages and features of the present invention will be understood by reference to the following specification in conjunction with the annexed drawing, wherein like parts have been given like numbers.

Figure 1:
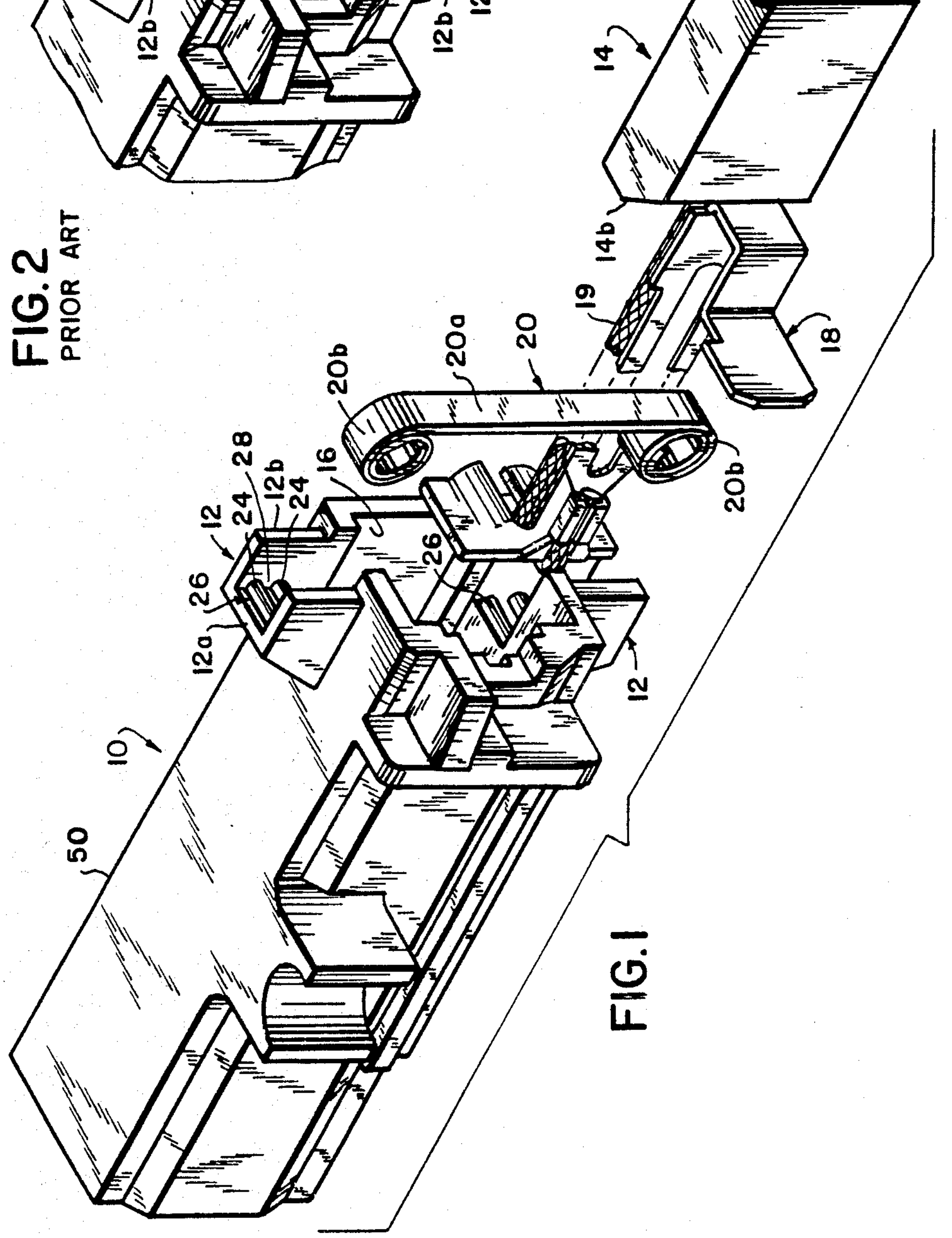
FIG. 1 is an exploded, perspective view of the box-like brush holder in accordance with the first preferred embodiment of the present invention.

Referring now to the figures of the drawing, and in particular for the moment to FIG. 1, there is seen a long-life motor brush holder in accordance with the present invention's construction. In this brush holder 10 which has first and second ends (not identified), there are provided, at the axially inner end of the holder, two diametrically opposed and outwardly extending receptacles 12. A brush 14 is housed at the interior 16, of the holder, a metal clip 18 being provided to fit within the interior of the brush holder for enabling electrical connection to the brush, while permitting the brush to move back and forth inside the housing. A flexible braided copper wire 19 is staked to the clip, the other end of wire 19 being tamped into the rear end of the brush.

Figure 3:
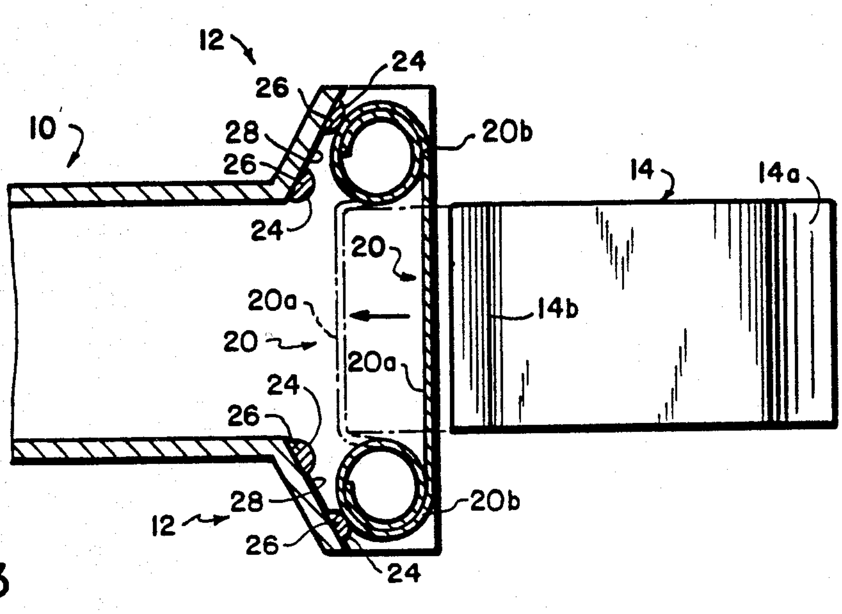
FIGS. 3 & 4 are sectional views, particularly illustrating the two receptacles provided at one end of the invention motor brush holder of FIG. 1, and particularly showing each of the coil portions of the spring abutting two cylindrical surfaces of the semi-cylindrical projections or ribs within the receptables, as well as two positions for the motor brush.
Figure 4:
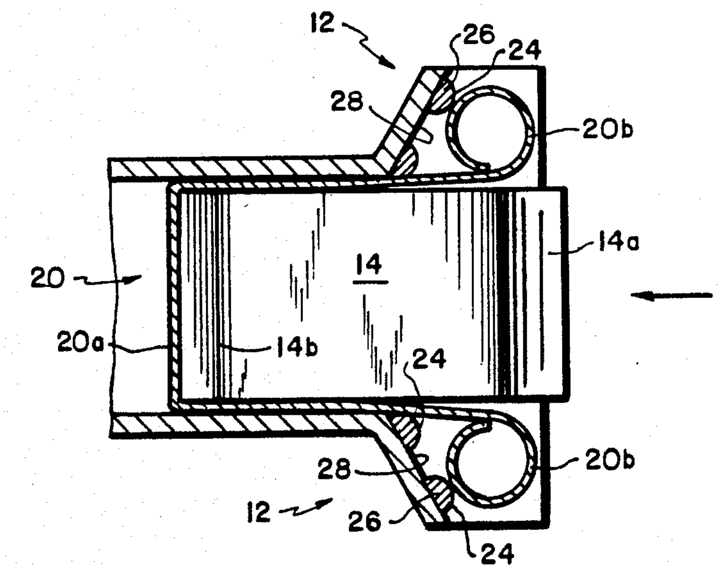

It will be noted, especially be reference to FIG. 3 & 4, that a ribbon spring 20 is also adapted to be disposed within the holder or housing 10. The brush, when new, is of such size that when pushed against the main portion **20*a* of the spring, it extends the spring all the way to the bottom of the holder. The coil portions 20*b* of the spring are retained within the respective receptacles 12**.

It will also be seen that the brush 14 includes a concave surface **14*a* bearing directly against a motor commutator; whereas, at the other end of the brush, a chamfered side 14*b* faces the clip 18**.

Figure 2:
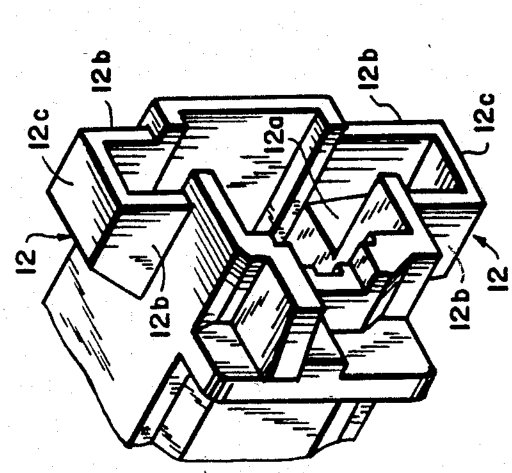
FIG. 2 PRIOR ART
FIG. 2 is a fragmentary view of the motor brush holder in accordance with the conventional or prior art construction.

In the conventional construction, which may be appreciated by referring to FIG. 2, the receptacles 12 are provided not only with a bottom or floor **12*a* and side walls 12*b*, but also with an outer wall 12*c*. In contrast therewith, the inventive construction of these receptacles involves the elimination of the outer wall 12*c* entirely. Consequenly, as the coil portion 20*b*** of the spring move back and forth in the receptacles there will be no tendency to hit the outer walls since they are nonexistent.

An additional feature of the present invenitn in respect to the receptacles 12 seen in FIG. 1 is that the angled floor **12*a* of these receptacles includes at least a pair of cylindrical surfaces 24 against which the coil portions of the springs make point or line contact. Consequently there is not the drag on the bottom or floor of these receptacles as is present with the conventional construction of FIG. 2. Also because of the nature of the semi-cylindrical ribs 26, which define surfaces 25, as well as a valley 28** between them, any debris in the form of carbon dust or the like is deposited in such valley, thereby to prevent the reduction in the freedom of the system to move that is encountered with the conventional construction. Pur another way, the freedom of the system is enhanced because, in the reeling and unreeling of the coil portions, they cannot drag on the floor of the receptacles and pick up the debris which inevitably occurs there in the conventional construction.

Figure 5:
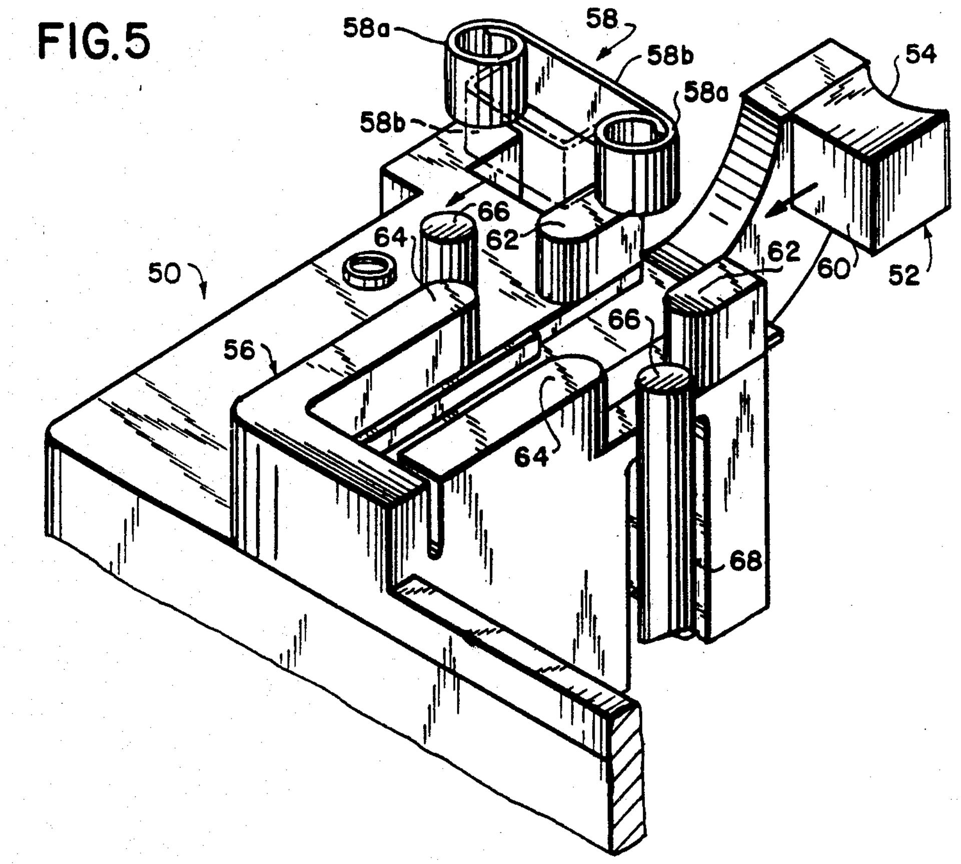
FIG. 5 is a perspective view of another preferred embodiment of a motor brush holder in accordance with the present invention.

Turning now to FIG. 5, there is presented in this figure a perspective view of another embodiment of a motor brush holder in accordance with the present invention. This motor brush holder is in the context of an integrally molded asssembly 50 because of the requirements for moldaility of the parts and the various compromises that have to be made because of the multiple functions of the one piece molding. This embodiment departs in certain respects from, but is fundamentally the same in principle as, the first embodiment already described. Where reference is made to "a one piece molding", it will be understood that the motor is actually formed in two halves, and that the half containing the brush holders as well as the other components, is of one piece construction.

Figure 6:
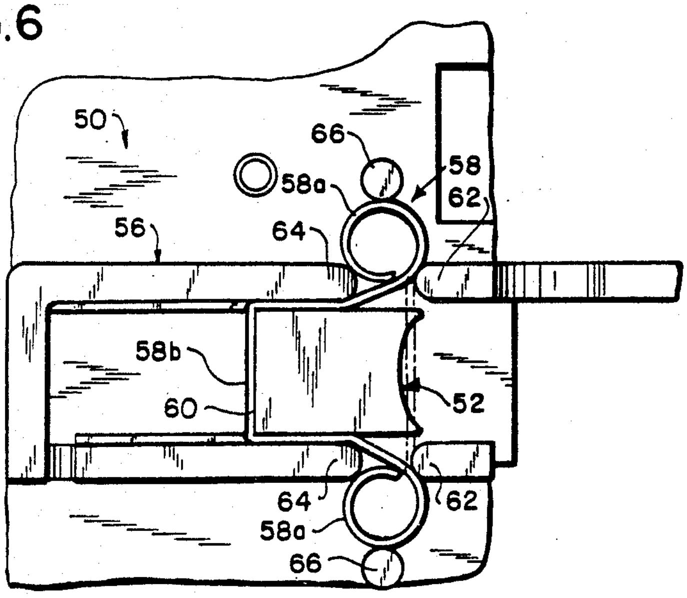
FIG. 6 is a plan view of the other prferred embodiment.

Thus, referring to FIGS. 5 & 6 in which the views are somewhat fragmentary, it will be understood that the above noted an assembly half 50 of the motor is therein depicted. It will be appreciated that the brush 52 has its concave inner surface 54 in a position in FIGS. 5 & 6 to bear against a commutator (not seen), whereas in FIG. 5 the brush is removed from the holder 56. The brush depicted in FIG. 5 is what typically remains at the end of brush life. In the beginning the brush was must longer and its outer end extended fully within the interior of the holder 56.

In accordance with the second embodiment, three point or line contact is provided for the coil portions **58*a* of the spring 58. The middle portion 58*b* thereof underlies the outer end surface 60 of the brush 52, and extends along the sides of the brush 52 as a result of the brush being pushed against the resilient spring 58. The three point support system for the spring is formed or defined by diametrically opposed molded members 62 and 64 for each of the spring coil portions 58*a*. The third point of contact or support is provided, in the case of each of the coil portions, by the respective dowel posts 66**.

It will be understood that in acordance with this second embodiment, three cylindrical surfaces, that is, the two provided or contributed by the semi-cylindrical end portions of the members 62 and 64, and the other cylindrical surfce by the dowel posts 66, enable conntrol of the spring reeling and dereeling with minimum frictional drag. This post configuration, as seen in FIGS. 5 & 6, has been designed in this manner so that it can be readily molded. As will be appreciated, this configuration passes directly in front of the intake vent 68 of the motor. Without such configuration it would be virtually impossible to mold the assembly; the only other alternative would be to close up the air intake. Thus, a significant advantage is achieved by the invention in the context of motor housings having integrally molded brush holders.

While there has been shown and described what is considered at present to be the preferred embodiment of the present invention, it will be appreciated by those skilled in the art that modification of such embodiment may be made. It is therefore desired that the invention not be limited to his embodiment, and it is intended to cover in the appended claims all such modifications as fall within the true spirit and scope of the invention.

We claim:

1. A motor brush holder for use with a motor commutator, comprising:

a brush holder, having first and second ends, and a motor brush retained within said holder while adapted to bear agaist the motor commutator;

a ribbon spring for urging the brush against said commutator, said spring including a middle portion for resiliently engaging said brush and a pair of end coil portions retained within said holder;

at least two pairs of spaced cylindrical surfaces forming part of said brush holder, a given pair serving as line contact supports for one of the respective coil portions of the spring, thereby to minimize contact of each coil portions with the holder and consequently reduce frictional drag.

2. A device as defined in claim 1 in which three cylindrical surfaces serve as said line contact supports for each coil portion of the spring.

3. A device as defined in claim 1, further including a pair of receptacles formed at one end of said holder for receiving said coil portions, each receptacle being defined by two side walls and a floor, and in which said two cylindrical surfaces are defined by semi-cylindrical projections on said floor of each of said receptacles.

4. A device as defined in claim 1 in which a metal clip is provided for enabling electrical connection to said brush, said clip being insertable at said first end of the holder.

5. A device as defined in claim 4, in which said brush includes a chamfered side facing said clip.

6. A device as defined in claim 1, further including a pair of receptacles formed at one end of said holder for receiving said coil portions of said spring, each of said receptacles including a floor and two side walls, and further including at least two semi-cylindrical projections on the floor of each of said receptacles for defining said line contact supports for each coil portion of the spring.

7. A device as defined in claim 6, in which a metal clip is provided for enabling electrical connection to said brush, said clip being insertable alongside said brush as said one end of the holder.

8. A device as defined in claim 7, in which said brush includes a chamfered side facing said clip.

9. In a motor brush holder including a motor brush, a spring having a main portion and a pair of coiled portions, and in which the holder includes a pair of receptacles for receiving the respective pair of coiled portions, each receptacle normally having an outer wall, side walls and a floor , the improvement comprising having only side walls and a floor for each of said receptacles, and the inclusion at the floor of each receptacle of a plurality of spaced semi-cylindrical projections against which the coiled portions abut, which causes the spring to ride smoothly while it reels and de-reels such that frictional drag is reduced, the space between the semi-cylindrical projections service as a reservoir for debris.

* * * * *